(12) United States Patent
Talley

(10) Patent No.: US 11,006,706 B2
(45) Date of Patent: May 18, 2021

(54) CUSTOMIZABLE ARTICLE AND METHODS FOR USE THEREOF

(71) Applicant: U-Lace, LLC, Rochester, NY (US)

(72) Inventor: Timothy J. Talley, Rochester, NY (US)

(73) Assignee: U-LACE, LLC, Rochester, NY (US)

( * ) Notice: Subject to any disclaimer, the term of this patent is extended or adjusted under 35 U.S.C. 154(b) by 0 days.

(21) Appl. No.: 16/725,044

(22) Filed: Dec. 23, 2019

(65) Prior Publication Data
US 2020/0205531 A1 Jul. 2, 2020

Related U.S. Application Data

(60) Provisional application No. 62/785,789, filed on Dec. 28, 2018.

(51) Int. Cl.
*A44C 5/00* (2006.01)
*A44C 25/00* (2006.01)
*A43C 9/02* (2006.01)
*B32B 3/00* (2006.01)

(52) U.S. Cl.
CPC .............. *A44C 25/00* (2013.01); *A43C 9/02* (2013.01); *B32B 3/00* (2013.01); *Y10T 428/24008* (2015.01)

(58) Field of Classification Search
CPC ..... A44C 5/007; A44C 5/0053; A44C 15/004; A44B 15/005; A43B 3/0078; A43B 23/24; Y10T 24/366
USPC ................ 40/5, 640, 661.04, 607.03, 611.11
See application file for complete search history.

(56) References Cited

FOREIGN PATENT DOCUMENTS

GB          511023          8/1939

*Primary Examiner* — Alexander S Thomas
(74) *Attorney, Agent, or Firm* — Ladas & Parry LLP

(57) ABSTRACT

A system for customizing an article. The system includes a base and at least one attachment having a decorative element and flanges flanking the decorative element and forming an opening on each side of the decorative element. The base has a plurality of projecting elements projecting from a surface of the base and having a protrusion at an end thereof or a plurality of pincers defining an inlet and a cavity. Each of the protrusions or pincers can be deformed to fit through the openings on each side of one of the decorative elements after which the protrusions or pincers will return to a non-deformed shape and secure the attachment with decorative element in the article. Also a method for customizing an article with the attachments.

19 Claims, 17 Drawing Sheets

CUSTOMIZABLE ARTICLE AND METHODS FOR USE THEREOF

CROSS REFERENCE TO RELATED APPLICATION

This application claims the benefit of U.S. provisional application Ser. No. 62/785,789 filed 28 Dec. 2018, the contents of which are incorporated herein by reference.

FIELD OF THE INVENTION

The present application relates to a system comprising an article and attachments for customizing the article, wherein the article comprises means for securing the attachments to the article. The article can be any of a range of different accessories, including a bracelet and a key chain. Also described are methods for customizing the article.

BACKGROUND OF THE INVENTION

There are known in the prior art systems comprising devices, such as bracelets and key chains, to which letters or other ornaments may be detachably affixed to customize the devices. British patent 511,023 describes one such system. U.S. Pat. No. 10,004,303 describes another. The former system is limited in the options available to a user whereas the latter is complicated to use. What is needed is a system for customizing articles that is simple to use and yet offers the user a multitude of different options for customizing the articles with ornaments or other decorative elements and for possible other uses of the ornaments.

SUMMARY OF THE INVENTION

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

In accordance with a first embodiment of the invention there is provided an apparatus comprising:

(a) a plurality of attachments, each attachment of the plurality of attachments comprising a decorative element and a pair of flanges projecting from the decorative element, including a first flange projecting from a first side of the decorative element and forming a first opening and a second flange projecting from an opposite side of the decorative element and forming a second opening of the same size and shape as the first opening, the decorative element, the first flange and the second flange being aligned linearly or substantially linearly along a common longitudinal axis; and (b) an article comprising a base having a top surface with a first periphery and a second periphery that is substantially parallel to the first periphery, and an array of means projecting from the surface for detachably attaching the plurality of attachments to the article with elastic deformation of the means from a non-deformed shape to a deformed shape when at least a portion of the means is forced through the first and second openings and with return of the means to a non-deformed shape when the at least portion of the means has passed through the first or second opening, wherein each of the first and second openings formed by the first and second flanges is shaped and dimensioned such that each of the array of means (i) is insertable through any one of the first or second openings formed by the first and second flanges when forced to the deformed shape, and (ii) returns to the non-deformed shape after insertion through the first or second openings and secures the attachment to the article unless and until the means is removed through the first or second openings with the use of force;

wherein the array of means comprises a first plurality of means evenly spaced along the surface closer to the first periphery than to the second periphery and a second plurality of means evenly spaced along the surface closer to the second periphery than to the first periphery, each of the plurality of means protruding from the shaft portion in at least a direction substantially parallel to the surface; and wherein each of the first plurality of means is disposed with respect to a corresponding one of the second plurality of means such that, with at least a portion of corresponding of the first and second plurality of means inserted through respective first and second openings of one of the plurality of attachments, the corresponding first and second plurality of means are aligned along the common longitudinal axis and the common longitudinal axis is disposed substantially perpendicular to the first and second peripheries of the surface.

In accordance with a preferred aspect of this embodiment, the array of means comprises an array of projections, including a first plurality of projections evenly spaced along the surface closer to the first periphery than to the second periphery and a second plurality of projections evenly spaced along the surface closer to the second periphery than to the first periphery, each of the plurality of projections comprising (i) a shaft portion extending from the surface in a direction substantially perpendicular to the surface and having a first end connected to the surface and a second end spaced from the surface, and (ii) a protruding portion protruding from the shaft portion in a direction substantially parallel to the surface, wherein each of the protruding portions is made of an elastic material such that each of the protruding portions deforms from the non-deformed shape to the deformed shape when compressed with a compressive force and returns to the non-deformed shape when the compressive force is removed, wherein each of the first and second openings formed by the first and second flanges is shaped and dimensioned such that each of the protruding portions (i) is insertable through any one of the first or second openings formed by the first and second flanges when compressed to the deformed shape, and (ii) returns to the non-deformed shape after insertion through the first or second openings and secures the attachment to the article unless and until the protruding portion is removed through the first or second openings with the use of compressive force, and wherein each of the plurality of first projections is disposed with respect to a corresponding one of the plurality of second projections such that, with corresponding of the first and second plurality of projections compressed and inserted through respective first and second openings of one of the plurality of attachments, the corresponding first and second projections are aligned along the common longitudinal axis and the common longitudinal axis is disposed substantially perpendicular to the first and second peripheries of the surface.

In accordance with another preferred aspect of this embodiment, the means comprises an array of pincers, including a first plurality of pincers evenly spaced along the surface closer to the first periphery than to the second periphery and a second plurality of pincers evenly spaced along the surface closer to the second periphery than to the first periphery, each of the plurality of pincers comprising (i) a pair of arcuate jaws extending from the surface in a direction substantially perpendicular to the surface and having respective ends spaced from the surface and defining an inlet leading to a cavity, wherein each of the jaws is made of an elastic material and is deformable by force to the deformed shape to increase the size of the inlet, wherein each of the first and second flanges of the article is sized and dimensioned to fit through the inlet defined by the jaws only when the jaws are in a deformed shape such that the jaws deform from the non-deformed shape to the deformed shape only when the first or second flange is forced through the inlet and into the cavity with the jaws returning to the non-deformed shape when the force is removed and the inlet returning to a size that secures the article to the base unless and until a force is applied, and wherein each of the first plurality of pincers is disposed with respect to a corresponding one of the second plurality of pincers such that, with corresponding of the first and second plurality of pincers securing one of the plurality of attachments to the base, the corresponding first and second pincers are aligned along the common longitudinal axis and the common longitudinal axis is disposed substantially perpendicular to the first and second peripheries of the surface.

In accordance with a preferred aspect of this embodiment, the article is selected from the group consisting of a bracelet, a key chain, a patch, a zipper pull, a ring, and an ID tag. In accordance with a particularly preferred aspect of this embodiment, the article is a circular bracelet or a keychain.

In accordance with another preferred aspect of this embodiment, the respective decorative elements of the plurality of attachments comprise different charms. For example, the charms may comprise different letters of the alphabet so as to allow a user or wearer of the article to form a name or initials on the article.

In accordance with yet another preferred aspect of this embodiment, the projections and the pincers are integrally formed with the surface.

In accordance with a still further aspect of this embodiment, each of the decorative elements has a top surface and a bottom surface and each of the first and second flanges of the attachments is connected to the bottom surface of the decorative element with the top surface of the decorative element being disposed above the first and second flanges about 2 to 3 mm.

In yet another preferred aspect of this embodiment, the decorative element, the first flange and the second flange are aligned substantially linearly along the common longitudinal axis with the decorative element, the first flange and the second flange forming a slight arc in which, when the article is disposed on a flat surface, a center of the arc is at most about 1 mm higher than respective endpoints of the arc.

In still another preferred aspect of this embodiment, the apparatus comprises a shoelace, and the plurality of attachments are shaped and dimensioned such that the shoelace can be laced in a shoe with the shoelace passing respectively through the first and second openings and beneath the decorative element of any one of the plurality of attachments to secure the attachment in the shoe with the shoelace laced in the shoe and the decorative element visible above the shoelace. It may be appreciated that, in this aspect of the invention, the user/wearer can secure the decorative element to the article or to the shoelace at his or her discretion.

In a still further aspect of this embodiment, each of the first and second openings has a rectangular shape, and each of the protruding portions of the projections comprises a substantially rectangular shape of larger dimension than the rectangular shape of the first and second openings. In another aspect of this embodiment, each of the protruding portions of the projections comprises an inclined portion to facilitate sliding of the protruding portion through the first or second opening.

In a preferred aspect of this embodiment, the apparatus further comprises locking means for inserting into holes in the article for adjusting a length of the article.

In another preferred aspect of this embodiment, the article comprises a recess at a first end of the article with at least a first hole formed therein and wherein the article comprises a plurality of holes at an opposite end of the article spaced apart from one another along a longitudinal axis of the article, the locking means comprising a body and at least one leg, the body being dimensioned to fit within the recess at the first end of the article, the at least one leg being dimensioned to fit through the at least one hole at the first end of the article and then through a selected one of the plurality of holes at the opposite end of the article with an interference fit to lock the article in a closed configuration with the body disposed in the recess.

In accordance with another embodiment of the invention, there is provided a method comprising:

(a) providing the apparatus described above, and (b) customizing the article by attaching a plurality of the attachments to the article by inserting the protruding portions of respective of the first and second plurality of projections through respective of the first and second flanges of each of the plurality of attachments with the use of compressive force, or (c) customizing a shoe by lacing the shoe with the shoelace, wherein the lacing includes threading the shoelace through at least the first and second openings formed by the first and second flanges of at least one of the plurality of attachments.

BRIEF DESCRIPTION OF THE DRAWINGS

The accompanying drawings are included to provide a further understanding of the disclosure and are incorporated in and constitute a part of this specification, illustrate embodiments of the disclosure, and together with the description serve to explain the principles of the disclosure.

DETAILED DESCRIPTION OF THE PREFERRED EMBODIMENTS

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
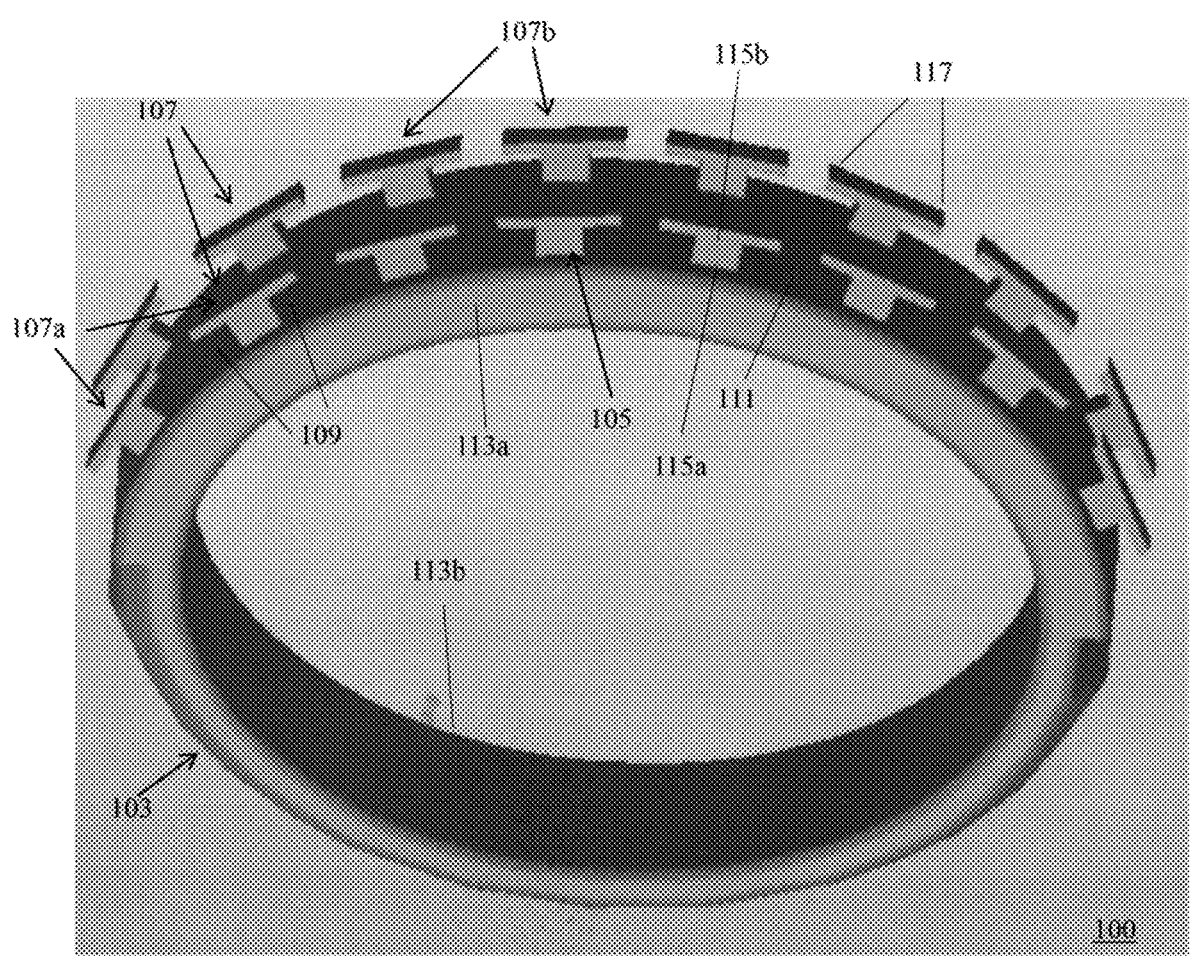
FIG. 1 illustrates an exemplary article of a system of customizable accessory according to one embodiment of the invention.

Referring to FIG. 1, there is seen an exemplary article according to one embodiment of the invention. The article 100 comprises a base 103 having a top surface 111 with a first periphery 113a and a second periphery 113b that is substantially parallel to the first periphery 113a, and an army of means 107 projecting from the surface for detachably attaching a plurality of attachments to the article 100 with elastic deformation of the means from a non-deformed shape to a deformed shape. The array of means 107 comprises a first plurality of means 107a evenly spaced along the surface 111 closer to the first periphery 113a than to the second periphery 113b and a second plurality of means 107b evenly spaced along the surface 111 closer to the second periphery 113b than to the first periphery 113a.

As shown in FIG. 1, the array of means may be an array of projections 107, including a first plurality of projections 107a evenly spaced along the surface 111 closer to the first periphery 113a than to the second periphery 113b and a second plurality of projections 107b evenly spaced along the surface 111 closer to the second periphery 113b than to the first periphery 113a. Each of the plurality of projections 107 comprises (i) a shaft portion 105 extending from the surface 111 in a direction substantially perpendicular to the surface 111 and having a first end 115a connected to the surface 111 and a second end 115b spaced from the surface 111, and (ii) a protruding portion 117 protruding from the shaft portion 105 in a direction substantially parallel to the surface 111. Each of the protruding portions 117 is made of an elastic material such that each of the protruding portions 117 deforms from the non-deformed shape to the deformed shape when compressed with a compressive force and returns to the non-deformed shape when the compressive force is removed.

Figure 2A:
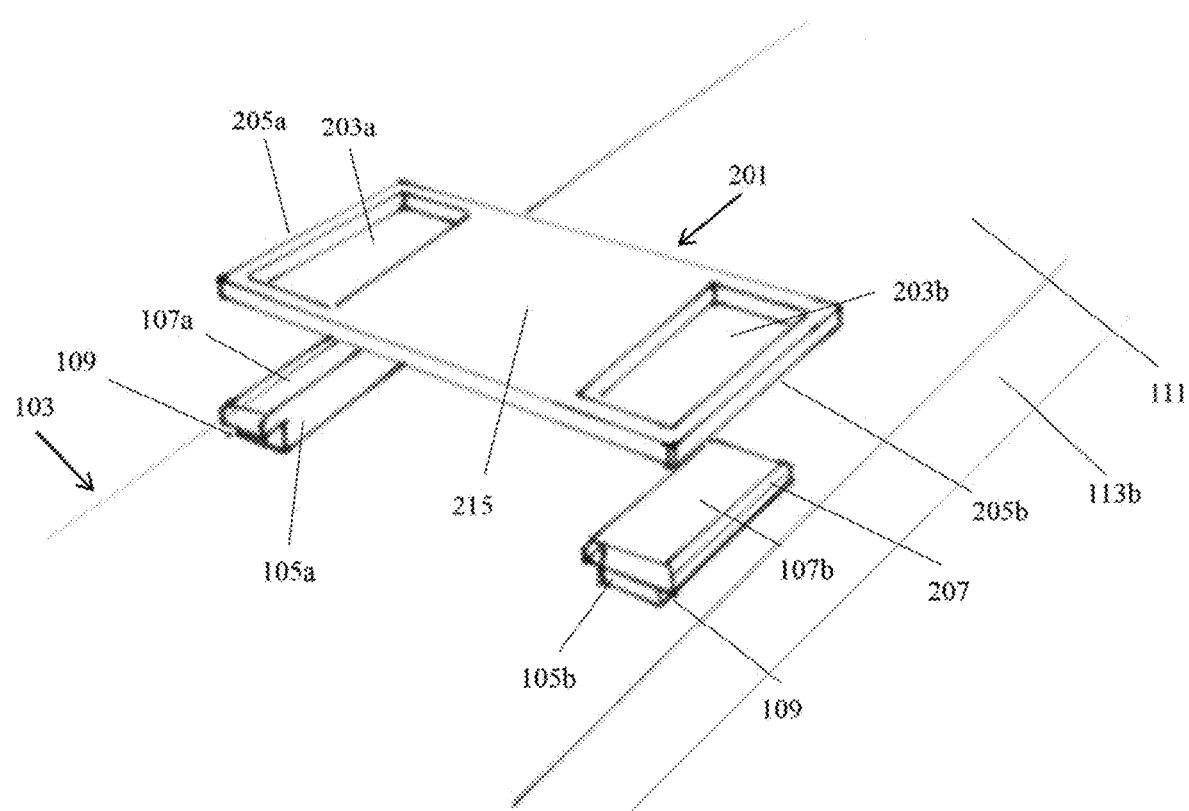
FIG. 2A is a perspective view of a portion of an exemplary system according to a first embodiment of the invention.

Referring to FIG. 2A, there is seen a perspective view of a portion of a customizable apparatus according to a first embodiment of the invention. The system comprises a plurality of attachments. Each attachment 201 of the plurality of attachments comprises a center portion 215 and a pair of flanges 205a, b projecting from the center portion 215. The center portion 215 may comprise a decorative element 501 as shown in FIG. 5. A first flange 205a projects from a first side of the center portion 215 and forms a first opening 203a. A second flange 205b projects from an opposite side of the center portion 215 and forms a second opening 203b of the same size and shape as the first opening 203a. The center portion 215 (and/or the decorative element 501), the first flange 205a and the second flange 205b are aligned linearly or substantially linearly along a common longitudinal axis.

In this embodiment, each of the first and second openings 203a, b formed by the first and second flanges 205a, b is shaped and dimensioned such that each of the protruding portions 117 (i) is insertable through any one of the first or second openings 203a, b formed by the first and second flanges 205a, b when compressed to the deformed shape, and (ii) returns to the non-deformed shape after insertion through the first or second openings 203a, b and secures the attachment 201 to the article 100 unless and until the protruding portion 117 is removed through the first or second openings 203a, b with the use of compressive force. Each of the first plurality of projections 107a is disposed with respect to a corresponding one of the second plurality of projections 107b such that, with corresponding of the first and second plurality of projections 107a, b compressed and inserted through respective first and second openings 203a, b of one of the plurality of attachments, the corresponding first and second projections 107a, b are aligned along the common longitudinal axis and the common longitudinal axis is disposed substantially perpendicular to the first and second peripheries 113a, b of the surface.

Figure 2B:
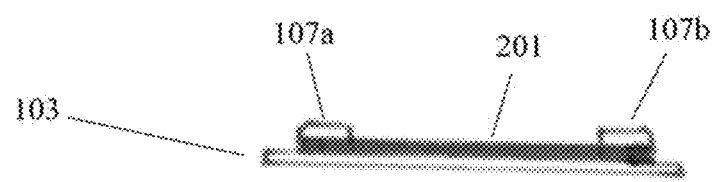
FIG. 2B is a side view of a portion of an exemplary system according to the first embodiment of the invention.
Figure 2C:
FIG. 2C is an end view of a portion of an exemplary system according to the first embodiment of the invention.

FIG. 2B is a side view of this embodiment when the attachment 201 is assembled with the article 100. Here, the attachment 201 is securely placed in the spaces 109 formed between the base 103 and the first and second plurality of projections 107a, b. FIG. 2C shows an end view of this configuration.

Figure 3A:
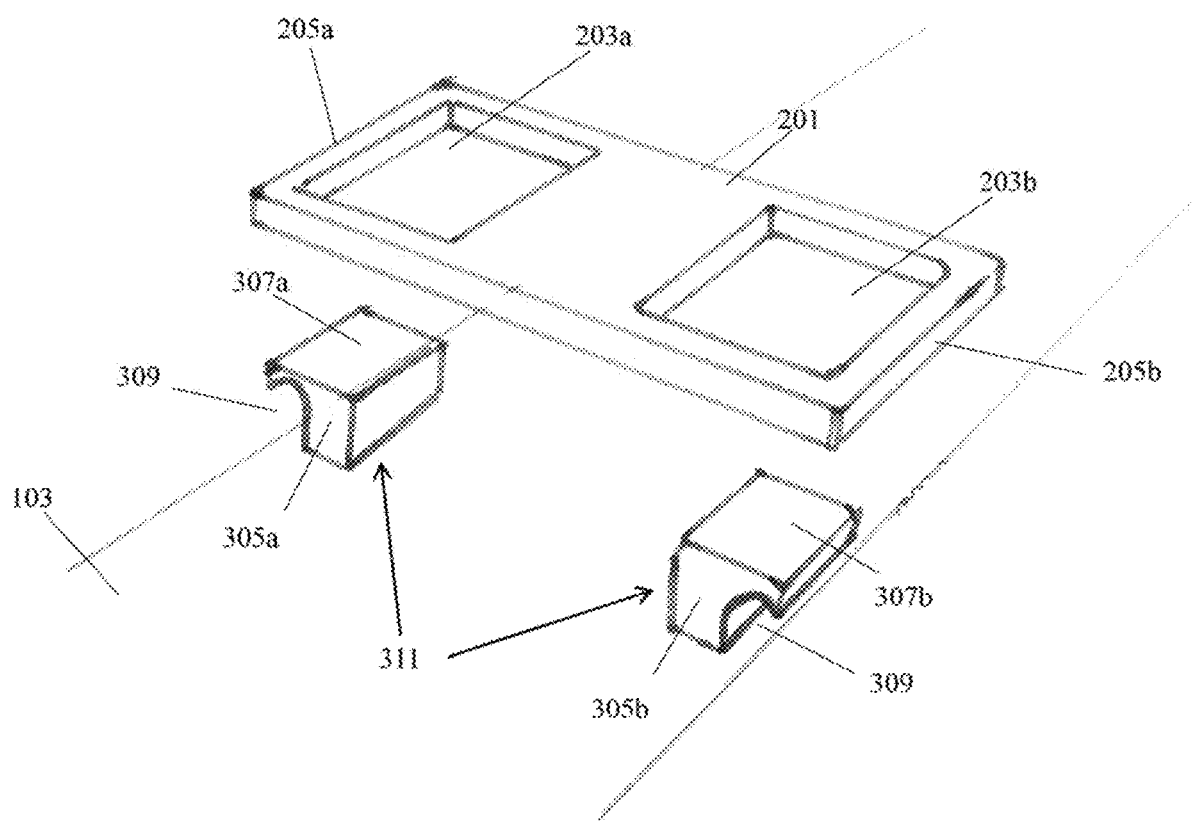
FIG. 3A is a perspective view of a portion of an exemplary system according to a second embodiment of the invention.
Figure 3B:
FIG. 3B is a side view of a portion of an exemplary system according to the second embodiment of the invention.

Referring to FIG. 3A, there is seen a perspective view of a portion of the apparatus according to a second embodiment of the invention. In this embodiment, a distance between an outer end of a protrusion 305a and an outer end of a protrusion 305b is equal to or smaller than a distance between an outer end of the first opening 203a and an outer end of the second opening 203b. However, a distance between an outer end of a securing means 307a and an outer end of a securing means 307b is greater than a distance between the outer end of the first opening 203a and the outer end of the second opening 203b, such that when the flanges 205a, b of the attachment 201 are pressed downward against the securing means 307a, b, the securing means 307a, b are bent downward to allow the flanges 205a, b of the attachment 201 to be placed in spaces 309 formed between the base 103 and the securing means 307a, b. In other words, the securing means 307a, b may be configured to outwardly protrude as shown in FIG. 3A, forming spaces 309 to securely "grab" the flanges 205a, b of the attachment 201. When the flanges 205a, b of the attachment 201 fit into the space 309, the securing means 307a, b returns to their original shape and securely grabs the flanges 205a, b of the attachment 201. FIG. 3B is a side view of this embodiment when the attachment 201 is assembled with the article 100.

Figure 4A:
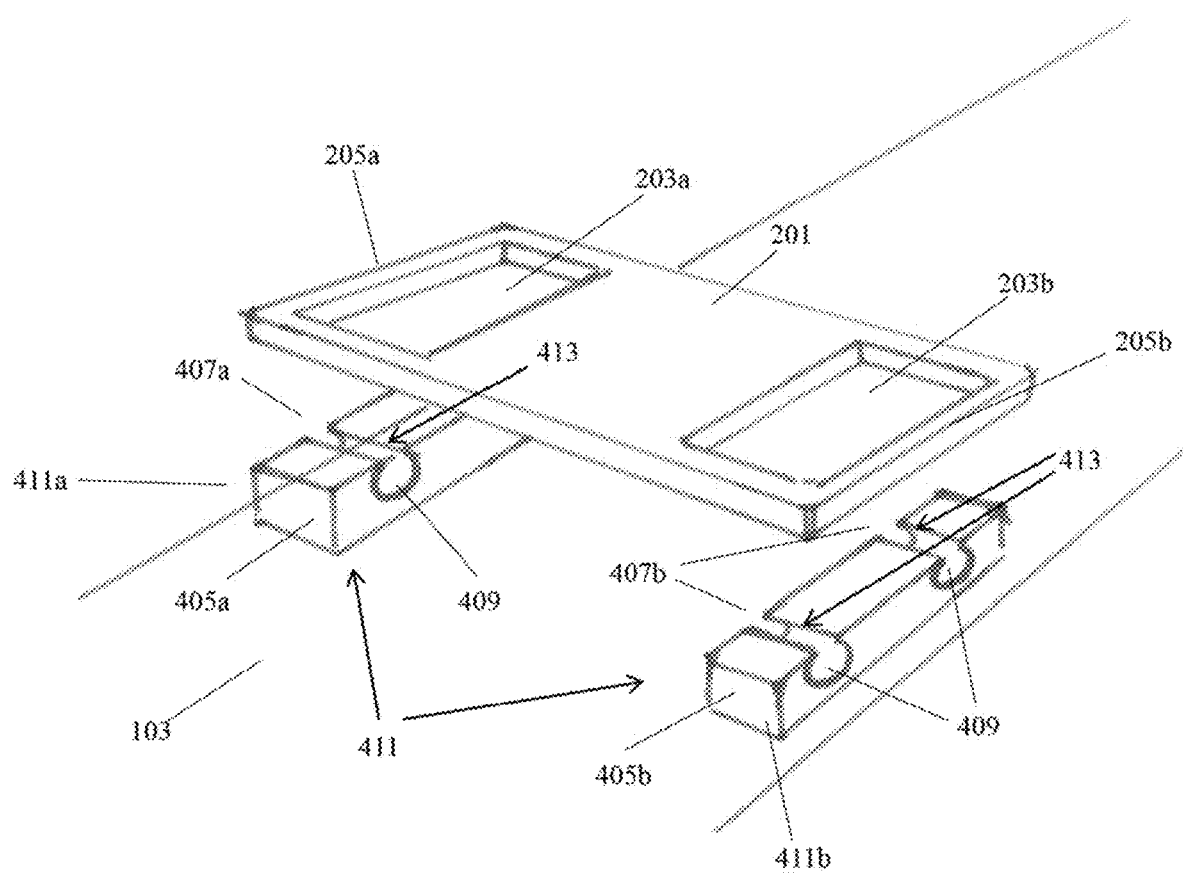
FIG. 4A is a perspective view of a portion of an exemplary system according to a third embodiment of the invention.

Referring to FIG. 4A, there is seen a perspective view of the system according to a third embodiment of the invention.

Figure 4B:
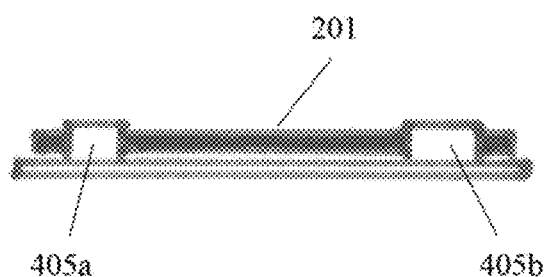
FIG. 4B is a side view of a portion of an exemplary system according to the third embodiment of the invention.
Figure 4C:
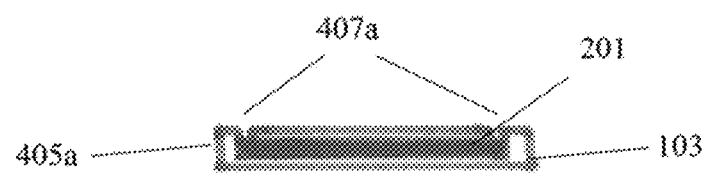
FIG. 4C is an end view of a portion of an exemplary system according to the third embodiment of the invention.

In this embodiment, the article 100 comprises an array of pincers 411, including a first plurality of pincers 411a evenly spaced along the surface 111 closer to the first periphery 113a than to the second periphery 113b and a second plurality of pincers 411b evenly spaced along the surface 111 closer to the second periphery 113b than to the first periphery 113a. Each of the plurality of pincers 411 comprises (i) a pair of arcuate jaws 407a or 407b extending from the surface 111 in a direction substantially perpendicular to the surface 111 and having respective ends spaced from the surface and defining an inlet 413 leading to a cavity 409. Each of the jaws 407a, b is made of an elastic material and are deformable by force to the deformed shape to increase the size of the inlet 413. Each of the first and second flanges 205a, b of the article 100 is sized and dimensioned to fit through the inlet 413 defined by the jaws 407a, b only when the jaws 407a, b are in a deformed shape such that the jaws 407a, b deform from the non-deformed shape to the deformed shape when a portion of the first or second flange 205a or 205b is forced through the inlet 413 and into the cavity 409 and return to the non-deformed shape when the force is removed. The inlet 413 returns to a size that secures the first or second flange 205a or 205b to the article 100 unless and until a force is applied. Each of the first plurality of pincers 407a is disposed with respect to a corresponding one of the second plurality of pincers 407b such that, with corresponding of the first and second plurality of pincers compressed and inserted through respective first and second openings 203a, b of one of the plurality of attachments, the corresponding first and second pincers 411a, b are aligned along the common longitudinal axis, and the common longitudinal axis is disposed substantially perpendicular to the first and second peripheries 113a, b, of the surface 111. FIGS. 4B and 4C are a side view and an end view of the article 100, respectively, when the attachment 201 is assembled with the article 100.

Figure 5A:
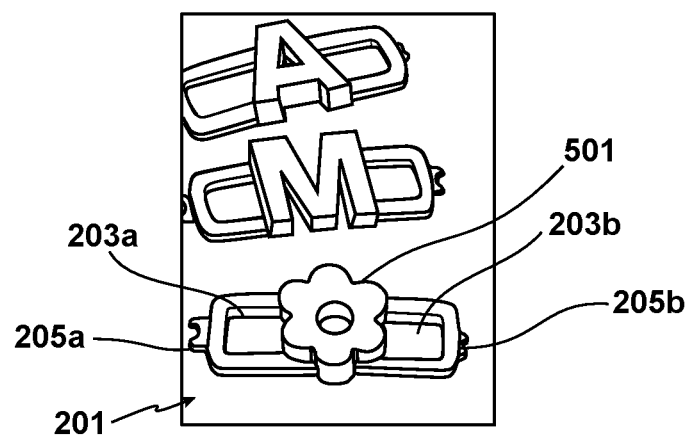
FIG. 5A illustrates exemplary charms according to one embodiment of the invention.
Figure 12:
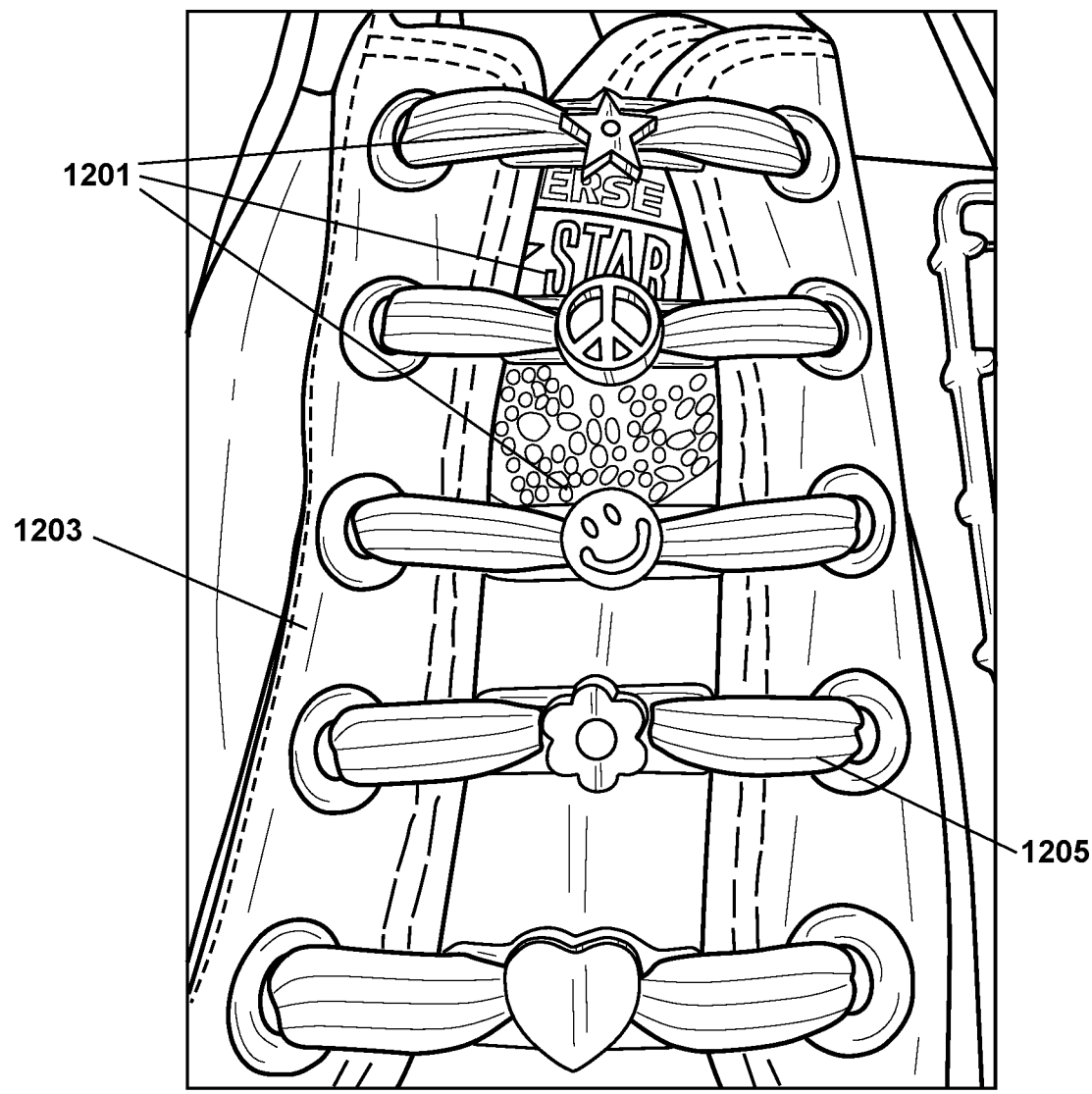
FIG. 12 shows attachments of an apparatus of the invention laced in a shoe.

Referring to FIG. 5A, there are seen exemplary attachments 201 according to one embodiment of the invention. An attachment 201 can comprise openings 203a, b, flanges 205a, b surrounding the openings 203a, b, and a decorative element 501 in a center of the attachment 201. The decorative element 501 may be for example a heart, a flower, a smiley face, a logo, a symbol, an alphabet of any language, etc. In accordance with one embodiment of the invention, a shoelace can be laced in a shoe with the shoelace passing through first and second openings of the attachment, as shown in FIG. 12.

Figure 5B:
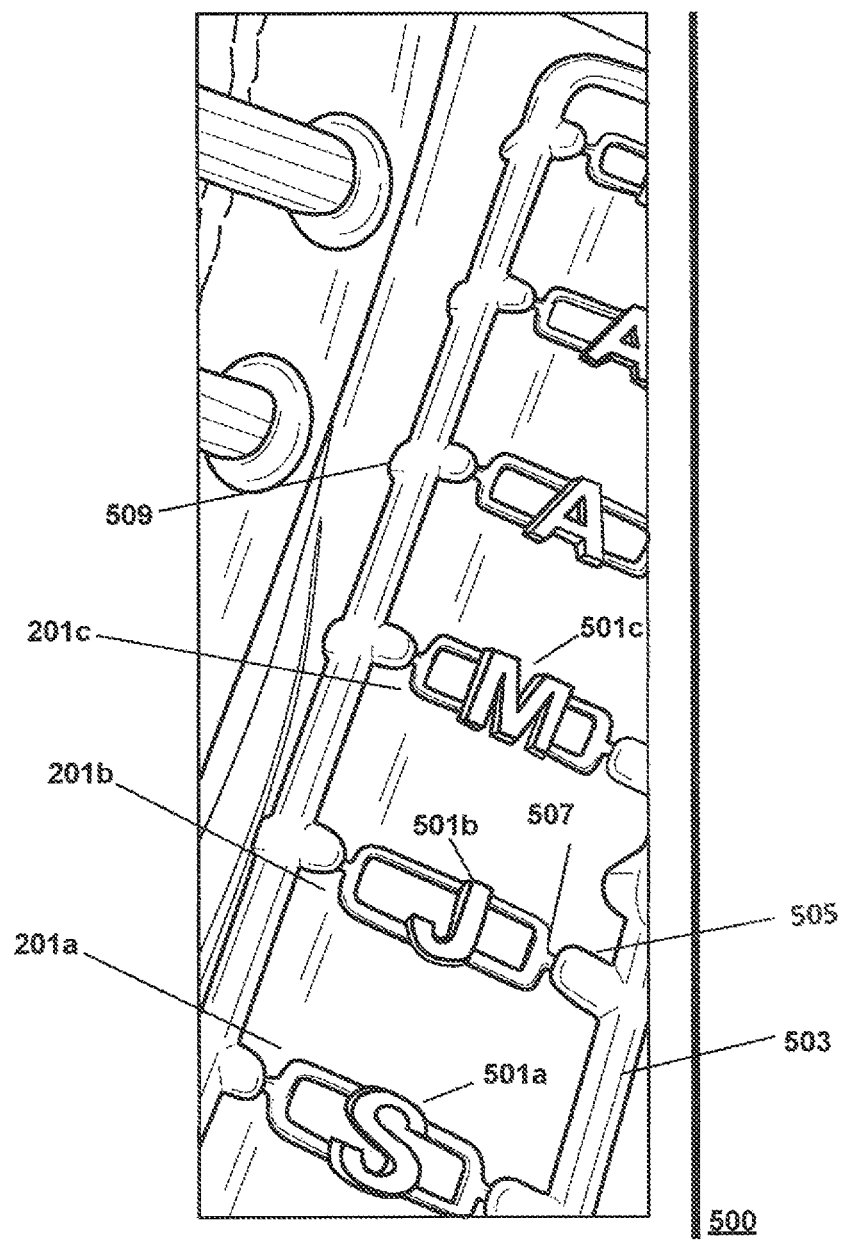
FIG. 5B illustrates an exemplary charm set according to one embodiment of the invention.

Referring to FIG. 5B, there is seen an attachment set 500 according to one embodiment of the invention. The attachment set 500 comprises a frame 503 that surrounds a plurality of attachments 201a-c, a plurality of connection parts 505, a plurality of detachable joints 507, and a plurality of supporting parts 509. A user may twist or rotate an attachment 201b around the axis of a detachable joint 507 to detach the attachment 201b from the attachment set 500. The plurality of supporting parts 509 not only allow the attachment set 500 to be safely placed on a surface but also lift the plurality of attachments 201a-c onto a higher plane from the surface where the user may readily detach the attachment 201 from the frame 503. Each of the attachments 201a-c may have different decorative elements 501a-c in the center of each of the attachments 201a-c.

Figure 6:
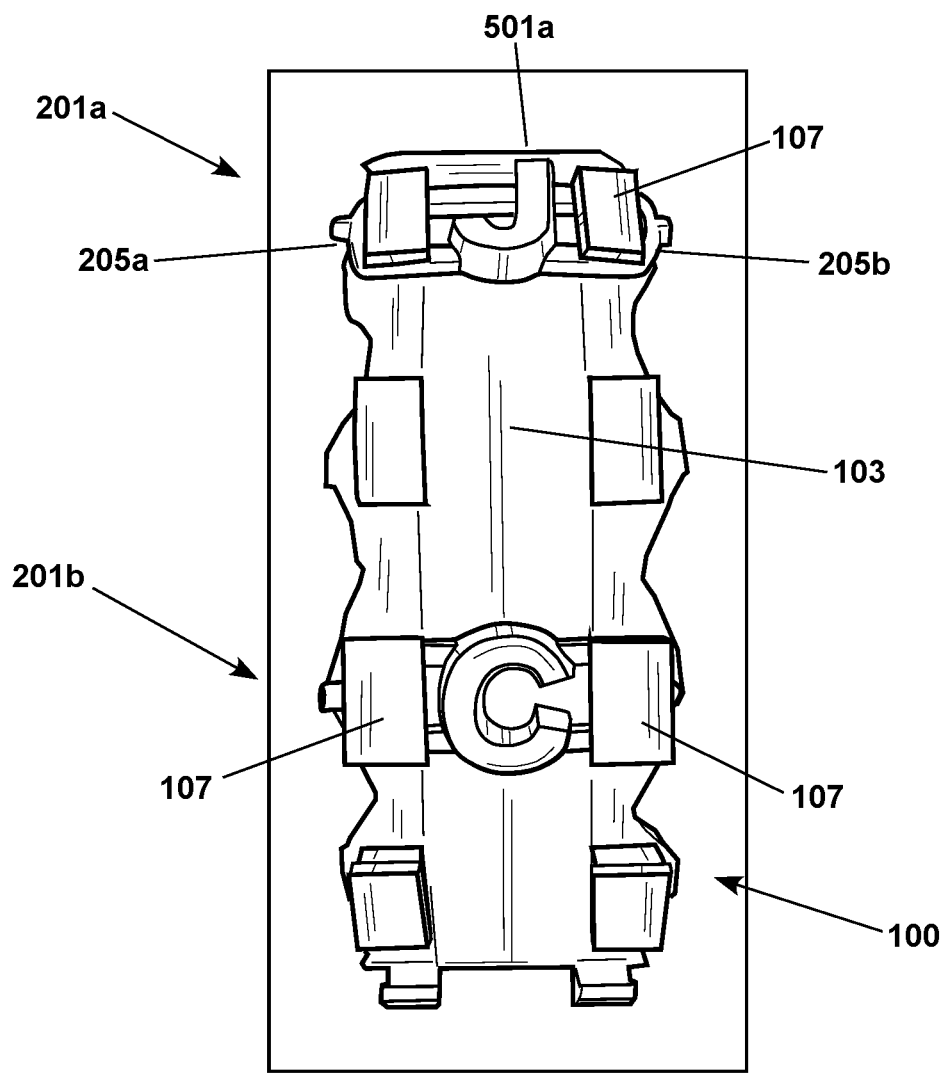
FIG. 6 is a top view of an exemplary system according to one embodiment of the invention.

Referring to FIG. 6, there is seen a top view of an exemplary apparatus according to one embodiment of the invention, wherein two attachments 201a, b are assembled with the article 100. Protrusions and the securing elements 107 of the article 100 are arranged in pairs in parallel. The flanges 205a, b of the first attachment 201a surround openings of the attachment 201a, through which the protrusion of the article 100 is positioned. The flanges 205a of the first attachment 201a are placed in spaces between the base 103 and the securing element 107. The base 103 and the securing element 107 securely grab the first attachment 201a. A shape 501a in the center of the first attachment 201a reads "J," wherein a shape 501b in the center of the second attachment 201b reads "C." The system is customizable by assembling attachments of different shapes with the article 100.

Figure 7A:
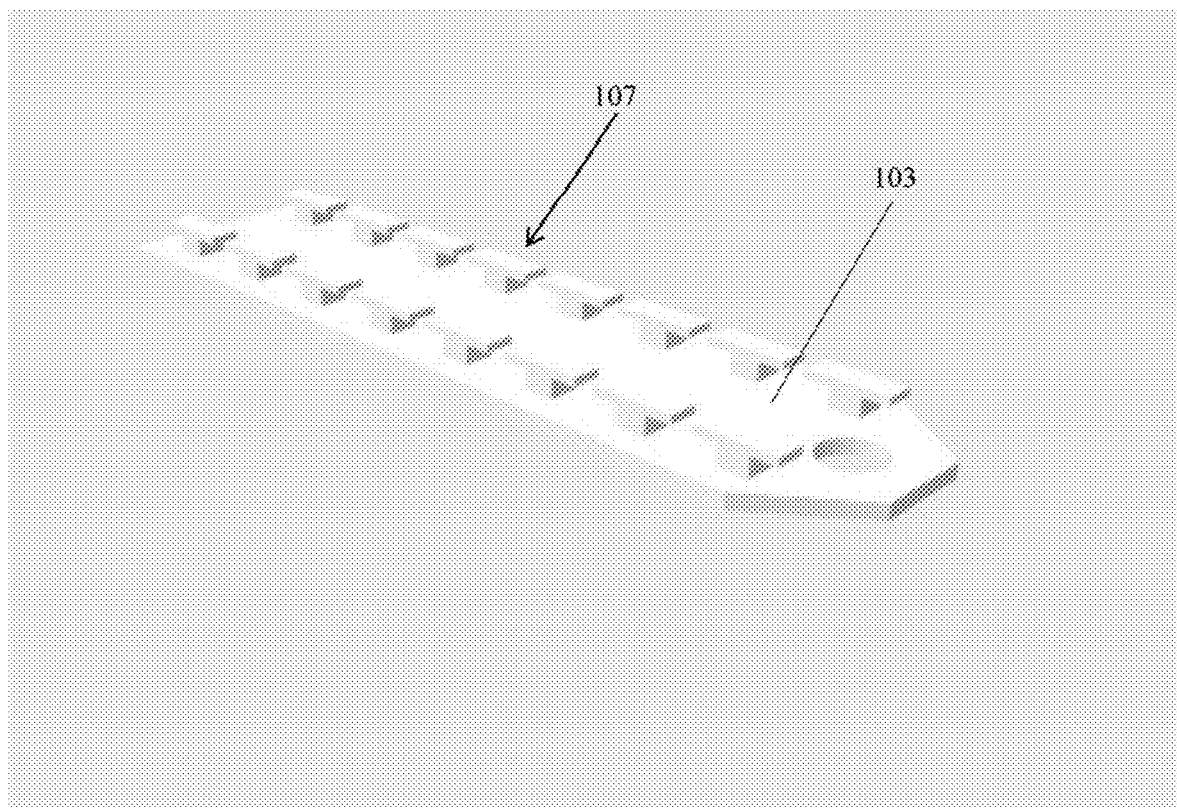
FIG. 7A is a perspective view of an exemplary article according to another embodiment of the invention.
Figure 7B:
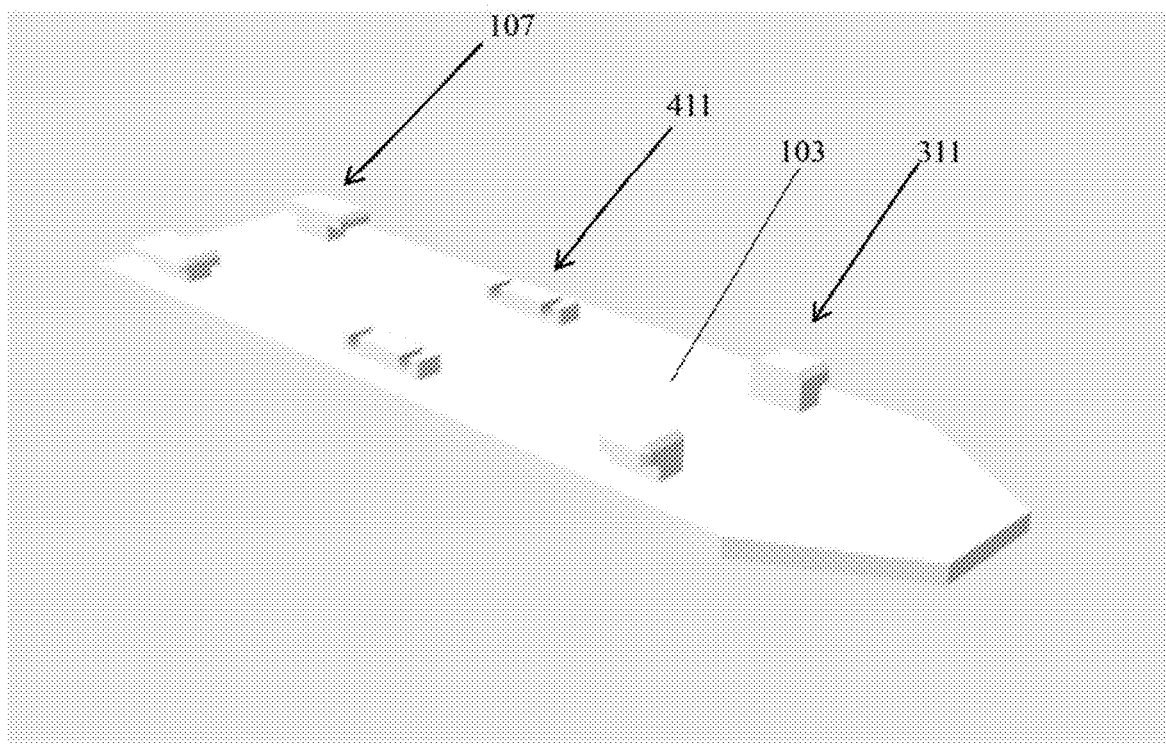
FIG. 7B is a perspective view of an exemplary article according to another embodiment of the invention.

Referring to FIG. 7A, there is seen a perspective view of an exemplary article of the system according to another embodiment of the invention. Here, the base 103 of the article is a flat plane, on which a plurality of projections 107 are placed. The plurality of projections 107 may be equally distanced in pairs in parallel. As shown in FIG. 7B, the article 100 may comprise different types of securing means. For example, the article 100 may comprise a pair of projections 107 shown in FIG. 1, a pair of securing means 311 shown in FIG. 2, and a pair of pincers 411 shown in FIG. 3.

Figure 8:
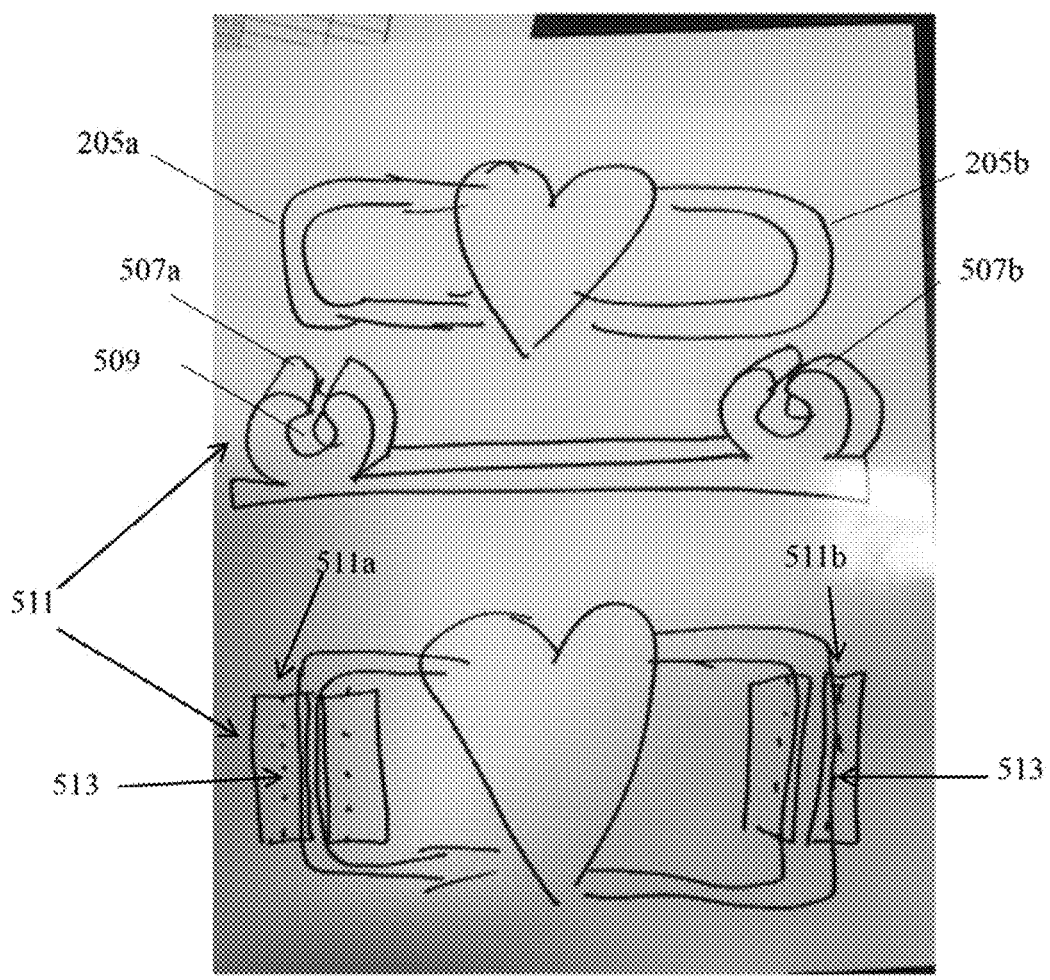
FIG. 8 illustrates an exemplary apparatus according to another embodiment of the invention.

Referring to FIG. 8, there is seen an example of the apparatus according to another embodiment of the invention. In this embodiment, the securing means is an array of pincers 511. The array of pincers 511 comprises a first plurality of pincers 511a and a second plurality of pincers 511b. The first plurality of pincers 511a are evenly spaced along the surface 111 closer to the first periphery 113a than to the second periphery 113b and the second plurality of pincers 511b are evenly spaced along the surface 111 closer to the second periphery 113b than to the first periphery 113a. Each of the plurality of pincers 511 comprises an arcuate jaw 507a or 507b extending from the surface 11 in a direction substantially perpendicular to the surface 111, having an end spaced from the surface L 1, and defining an inlet 513 leading to a cavity 509. Each of the jaws 507a, b is made of an elastic material and is deformable by force to a deformed shape to increase the size of the inlet 513. Each of the first and second flanges 205a, b of the article 100 is sized and dimensioned to fit through the inlet 513 defined by the jaws 507a, b only when the jaws 507a, b are in a deformed shape such that the jaws 507a, b deform from the non-deformed shape to the deformed shape when a portion of the first or second flange 205a or 205b is forced through the inlet 513 and into the cavity 509 and return to the non-deformed shape when the force is removed. The inlet 513 returns to a size that secures the first and second flange 205a or 205b to the article 100) unless and until a force is applied, and wherein each of the first plurality of pincers 507a is disposed with respect to a corresponding one of the second plurality of pincers 507b such that, with corresponding of the first and second plurality of pincers 511a, b compressed and inserted through respective first and second openings 203a, b of one of the plurality of attachments, the corresponding first and second pincers 511a, b are aligned along the common longitudinal axis, and the common longitudinal axis is disposed substantially perpendicular to the first and second peripheries 113a, b of the surface 111.

Figure 9:
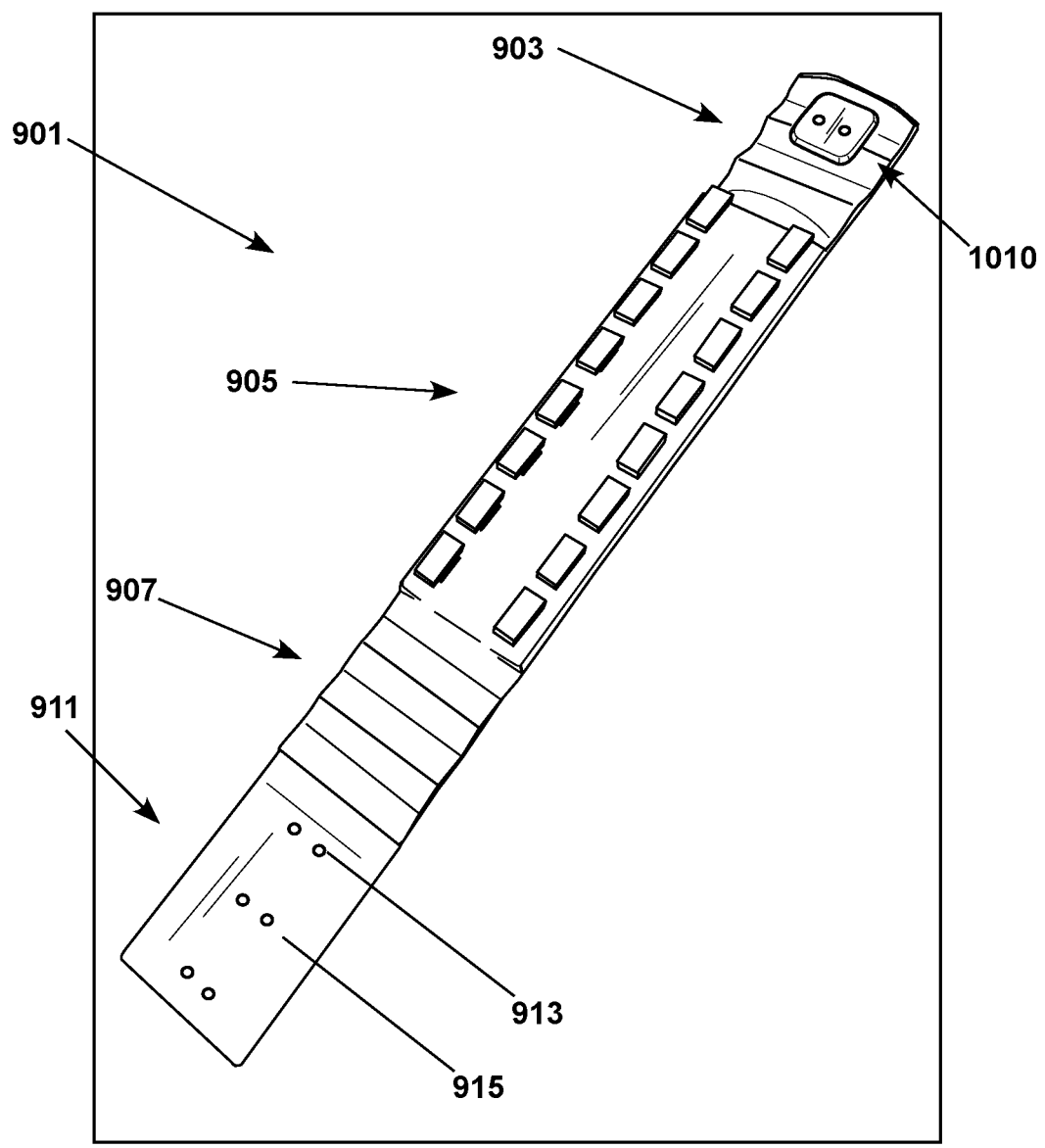
FIG. 9 illustrates an adjustable customizable accessory of the invention with an adjustable article in an open configuration according to another embodiment of the invention.
Figure 10A:
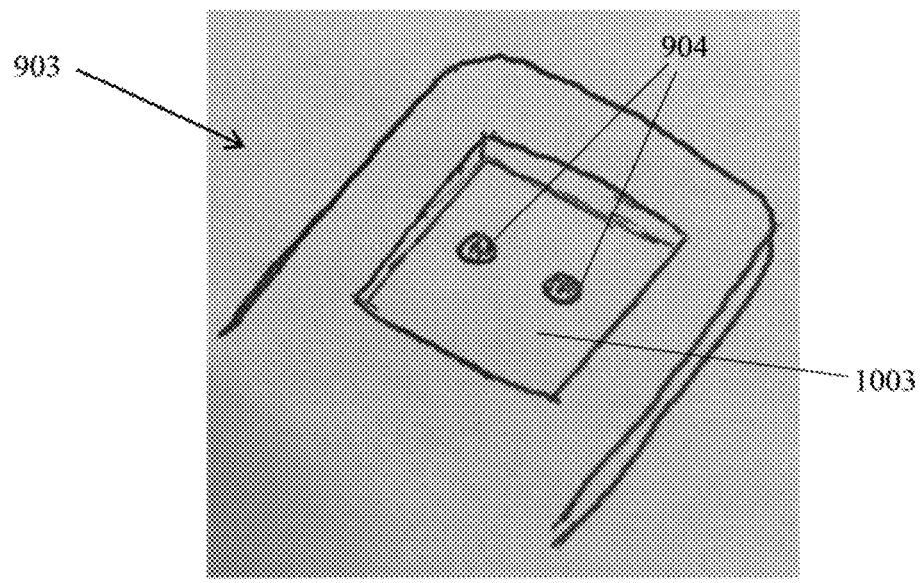
FIG. 10A is a close-up view of a locking member of the adjustable article of FIG. 9.
Figure 10B:
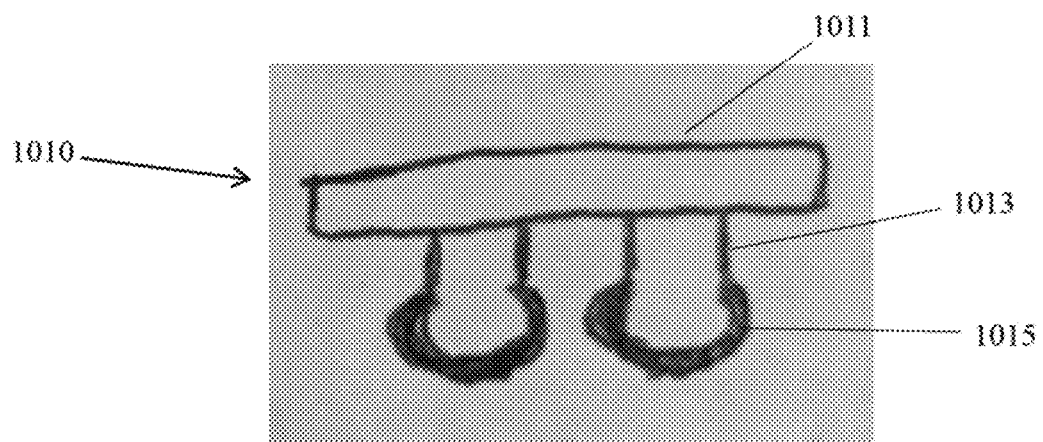
FIG. 10B is a front view of the locking member of the adjustable article of FIG. 9.
Figure 11:
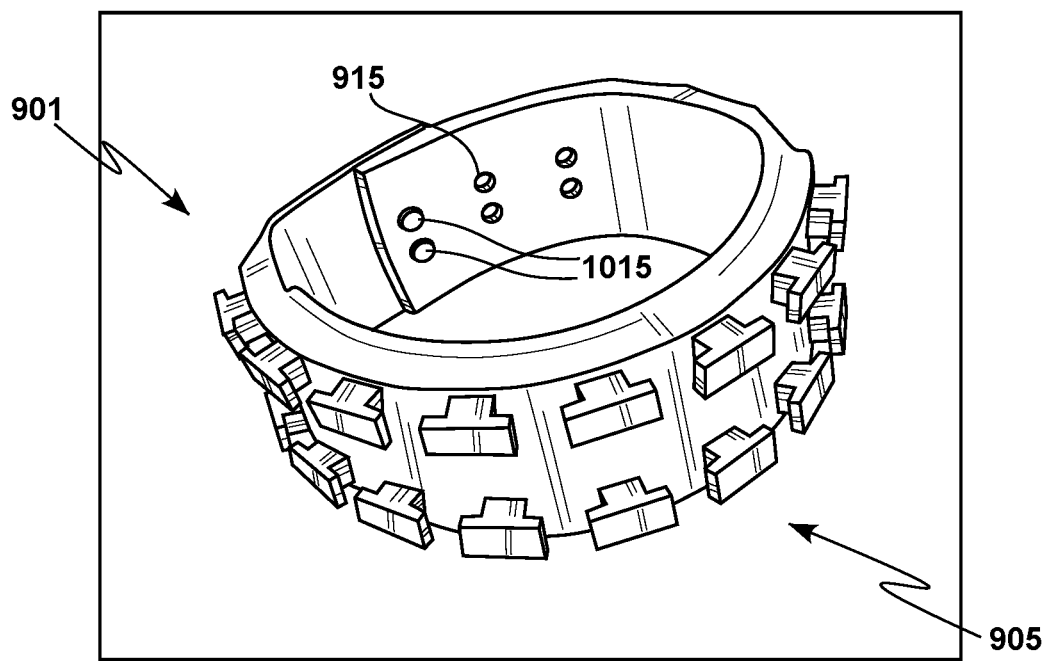
FIG. 11 illustrates the adjustable accessory shown in FIG. 9 with the adjustable article in a closed configuration.

Referring to FIGS. 9-11, there is seen a customizable accessory of the invention with an article that is adjustable to allow adjustment of the length of the article. This enables a user to adjust the fit of the article on a body part of the user; e.g., a wrist. FIG. 9 shows the article in an open configuration. Article 901 of the system comprises a first segment 903 at one end of the article 901, a second segment 905 adjacent to the first segment 903 having an array of projections, a third segment 907 adjacent to the second segment, and a fourth segment 911 at another end of the article 911 adjacent to the third segment.

The length of the adjustable article 901 may be adjusted with locking means as shown in FIG. 9 with reference to FIGS. 10A and 10B and discussed next. The first segment 903 comprises holes 904. The first segment 903 can further comprise a recessed area 1003 in which the holes 904 are disposed. The holes 904 accommodate locking member 1010. The second segment 905 comprises an array of projections as explained above with regard to FIGS. 1-4C. The third segment 907 may comprise ramp structures that are decorative and facilitate deformation of the article 901 in a desired direction as shown in FIG. 9. The fourth segment 911 comprises holes 913 that has a radius substantially identical to that of the holes 904 of the first segment 903. The fourth segment 911 comprises additional holes 915 distanced from the holes 913 such that by selecting either holes 913 or holes 915 for insertion of locking member 1010, the radius of the article 901 in a closed configuration can be adjusted.

Referring to FIG. 10A-B it can be seen that locking member 1010 can be disposed in the recessed area 1003. The locking member 1010 comprises a body 1011 and legs 1013 that can be inserted into the holes 904 of the first segment 903 and then into the holes 913 of the fourth segment 911. A proximal end of the legs 1013 of the locking member 1010 is attached to one side of the body 1011 of the locking member 1010, wherein a distal end 1015 of the legs 1013 is in a rounded and bulkier structure such that when the legs 1013 of the locking member 1010 is pressed against the holes 904 of the first and fourth segments 903, 911 of the article 901, the holes 904 are deformed to allow the distal end 1015 of the legs 1013 to pass through. This feature allows the locking member 1010 to firmly secure the closed configuration of the article 901. Preferably, the thickness of the proximal end of the legs 1013 is substantially the same as that of the holes 904 of the first and fourth segments 903, 911, whereas the thickness of the distal end 1015 of the legs 1013 is slightly thicker than that of the proximal end of the legs 1013.

In FIG. 11, there is seen the article 901 in a closed configuration with the locking member 1010 inserted in the holes 904 of the first segment 903 and in the holes 913 of the fourth segment 911, with the first segment 903 and the fourth segment 911 overlapped. A user can adjust the radius of the article 901 in the closed configuration by inserting the locker 1010 into holes 915 of the fourth segment 911, instead of the holes 913.

Referring to FIG. 12, there is seen a plurality of attachments 1201 laced in a shoe 1203 with the shoelace 1205 passing respectively through the first and second openings of the each of the plurality of attachments 1201 and beneath the decorative element of any one of the plurality of attachments 1201 to secure the attachment in the shoe 1203 with the shoelace 1205 laced in the shoe 1203 and the decorative element visible above the shoelace 1205.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. An apparatus comprising:
    (a) a plurality of attachments, each attachment of the plurality of attachments comprising a decorative element and a pair of flanges projecting from the decorative element, including a first flange projecting from a first side of the decorative element and forming a first opening and a second flange projecting from an opposite side of the decorative element and forming a second opening of the same size and shape as the first opening, the decorative element, the first flange and the second flange being aligned linearly or substantially linearly along a common longitudinal axis; and
    (b) an article comprising a base having a top surface with a first periphery and a second periphery that is substantially parallel to the first periphery, and an array of means projecting from the surface for detachably attaching the plurality of attachments to the article with elastic deformation of the means from a non-deformed shape to a deformed shape when at least a portion of the means is forced through the first and second openings and with return of the means to a non-deformed shape when the at least portion of the means has passed through the first and second openings, wherein each of the first and second openings formed by the first and second flanges is shaped and dimensioned such that each of the array of means (i) is insertable through any one of the first or second openings formed by the first and second flanges when forced to the deformed shape, and (ii) returns to the non-deformed shape after insertion through the first or second openings and secures the attachment to the article unless and until the means is removed through the first or second openings with the use of force;
    wherein the array of means comprises a first plurality of means evenly spaced along the surface closer to the first periphery than to the second periphery and a second plurality of means evenly spaced along the surface closer to the second periphery than to the first periphery, each of the plurality of means protruding from the shaft portion in at least a direction substantially parallel to the surface; and wherein each of the first plurality of means is disposed with respect to a corresponding one of the second plurality of means such that, with at least a portion of corresponding of the first and second plurality of means inserted through respective first and second openings of one of the plurality of attachments, the corresponding first and second plurality of means are aligned along the common longitudinal axis and the common longitudinal axis is disposed substantially perpendicular to the first and second peripheries of the surface.

2. The apparatus according to claim 1, wherein the array of means comprises an array of projections, including a first plurality of projections evenly spaced along the surface closer to the first periphery than to the second periphery and a second plurality of projections evenly spaced along the surface closer to the second periphery than to the first periphery, each of the plurality of projections comprising (i)

a shaft portion extending from the surface in a direction substantially perpendicular to the surface and having a first end connected to the surface and a second end spaced from the surface, and (ii) a protruding portion protruding from the shaft portion in a direction substantially parallel to the surface, wherein each of the protruding portions is made of an elastic material such that each of the protruding portions deforms from the non-deformed shape to the deformed shape when compressed with a compressive force and returns to the non-deformed shape when the compressive force is removed, wherein each of the first and second openings formed by the first and second flanges is shaped and dimensioned such that each of the protruding portions (i) is insertable through any one of the first or second openings formed by the first and second flanges when compressed to the deformed shape, and (ii) returns to the non-deformed shape after insertion through the first or second openings and secures the attachment to the article unless and until the protruding portion is removed through the first or second openings with the use of compressive force, and wherein each of the first plurality of projections is disposed with respect to a corresponding one of the second plurality of projections such that, with corresponding of the first and second plurality of projections compressed and inserted through respective first and second openings of one of the plurality of attachments, the corresponding first and second projections are aligned along the common longitudinal axis and the common longitudinal axis is disposed substantially perpendicular to the first and second peripheries of the surface.

3. The apparatus according to claim 2, wherein the projections are integrally formed with the surface.

4. The apparatus according to claim 2, wherein each of the first and second openings has a rectangular shape and wherein each of the protruding portions of the projections comprises a substantially rectangular shape of larger dimension than the rectangular shape of the first and second openings.

5. The apparatus according to claim 4, wherein each of the protruding portions of the projections comprises an inclined portion to facilitate sliding of the protruding portion through the first or second opening.

6. The apparatus according to claim 1, wherein the means comprises an array of pincers, including a first plurality of pincers evenly spaced along the surface closer to the first periphery than to the second periphery and a second plurality of pincers evenly spaced along the surface closer to the second periphery than to the first periphery, each of the plurality of pincers comprising a pair of arcuate jaws extending from the surface in a direction substantially perpendicular to the surface and having respective ends spaced from the surface and defining an inlet leading to a cavity, wherein each of the jaws is made of an elastic material and is deformable by force to the deformed shape to increase the size of the inlet, wherein each of the first and second flanges of the article is sized and dimensioned to fit through the inlet defined by the jaws only when the jaws are in a deformed shape such that the jaws deform from the non-deformed shape to the deformed shape only when the first or second flange is forced through the inlet and into the cavity with the jaws returning to the non-deformed shape when the force is removed and the inlet returning to a size that secures the article to the base unless and until a force is applied, and wherein each of the first plurality of pincers is disposed with respect to a corresponding one of the second plurality of pincers such that, with corresponding of the first and second plurality of pincers securing one of the plurality of attachments to the base, the corresponding first and second pincers are aligned along the common longitudinal axis and the common longitudinal axis is disposed substantially perpendicular to the first and second peripheries of the surface.

7. The apparatus according to claim 6, wherein the pincers are integrally formed with the surface.

8. The apparatus according to claim 1, wherein the article is selected from the group consisting of a bracelet, a key chain, a patch, a zipper pull, a ring, and an ID tag.

9. The apparatus according to claim 1, wherein the article is a circular bracelet.

10. The apparatus according to claim 1, wherein the respective decorative elements of the plurality of attachments comprise different charms.

11. The apparatus according to claim 10, wherein the respective decorative elements of the plurality of attachments comprise different letters of the alphabet.

12. The apparatus according to claim 1, wherein each of the decorative elements has a top surface and a bottom surface and wherein each of the first and second flanges of the attachments is connected to the bottom surface of the decorative element with the top surface of the decorative element being disposed above the first and second flanges about 2 to 3 mm.

13. The apparatus according to claim 1, wherein the decorative element, the first flange, and the second flange are aligned substantially linearly along the common longitudinal axis with the decorative element, the first flange and the second flange forming a slight arc in which, when the article is disposed on a flat surface, a center of the arc is at most about 1 mm higher than respective endpoints of the arc.

14. The apparatus according to claim 1, further comprising a shoelace, wherein the plurality of attachments are shaped and dimensioned such that the shoelace can be laced in a shoe with the shoelace passing respectively through the first and second openings and beneath the decorative element of any one of the plurality of attachments to secure the attachment in the shoe with the shoelace laced in the shoe and the decorative element visible above the shoelace.

15. A method comprising:
  (a) providing the apparatus according to claim 14; and
  (b) customizing a shoe by lacing the shoe with the shoelace, wherein the lacing includes threading the shoelace through at least the first and second openings formed by the first and second flanges of at least one of the plurality of attachments.

16. The apparatus according to claim 1, wherein each of the first and second openings has a rectangular shape.

17. A method comprising:
  (a) providing the apparatus according to claim 1; and
  (b) customizing the article by attaching a plurality of the attachments to the article by inserting the protruding portions of respective of the first and second plurality of projections through respective first and second flanges of each of the plurality of attachments with the use of compressive force.

18. The apparatus according to claim 1, further comprising locking means for inserting into holes in the article for adjusting a length of the article.

19. The apparatus according to claim 18, wherein the article comprises a recess at a first end of the article with at least a first hole formed therein and wherein the article comprises a plurality of holes at an opposite end of the article spaced apart from one another along a longitudinal axis of the article, the locking means comprising a body and at least one leg, the body being dimensioned to fit within the recess at the first end of the article, the at least one leg being dimensioned to fit through the at least one hole at the first end of the article and then through a selected one of the plurality of holes at the opposite end of the article with an interference fit to lock the article in a closed configuration with the body disposed in the recess.

* * * * *